Figure 1:
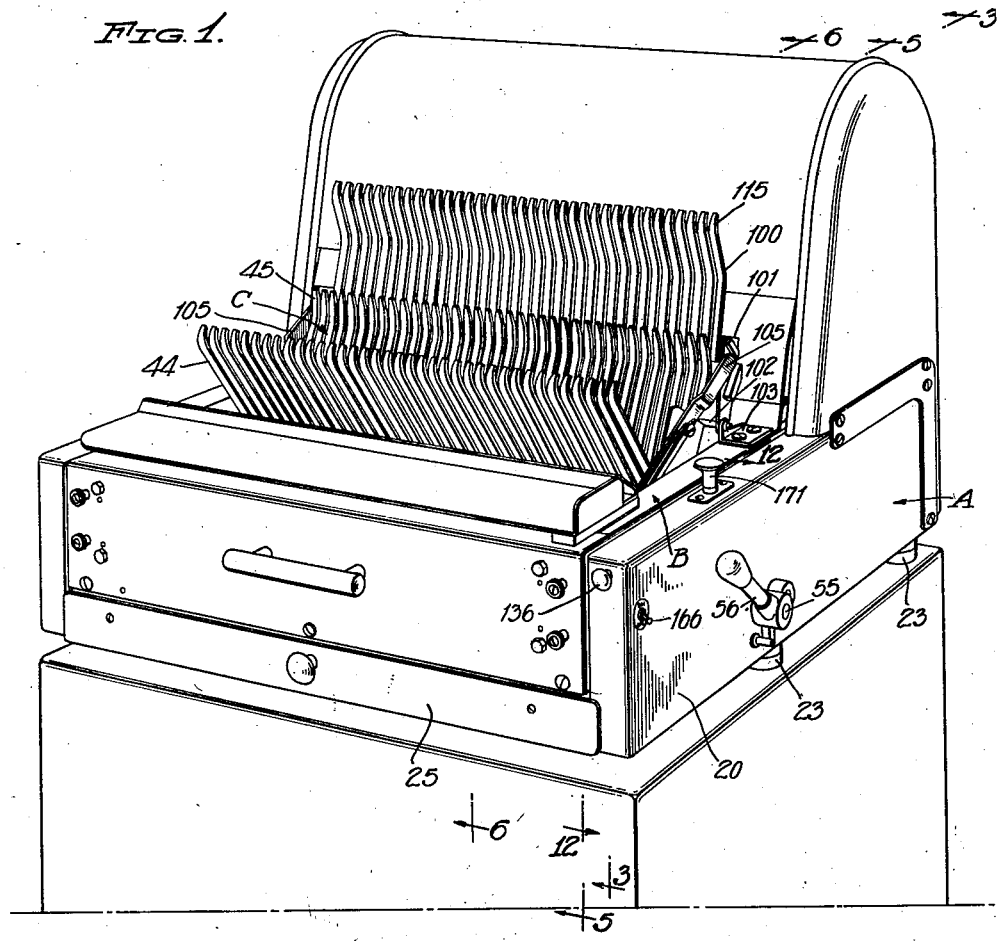

Morris Brustowsky, Inventor.

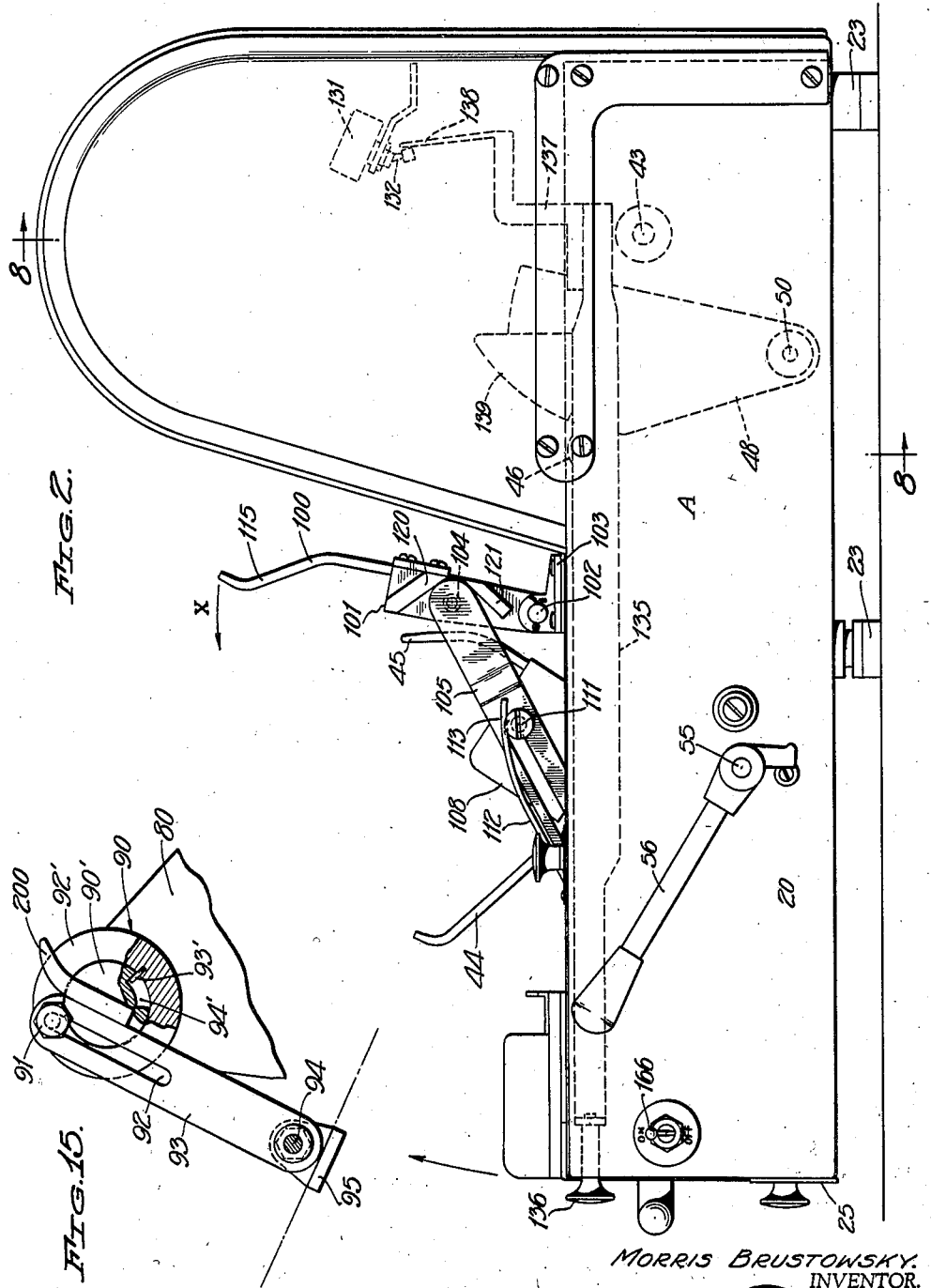

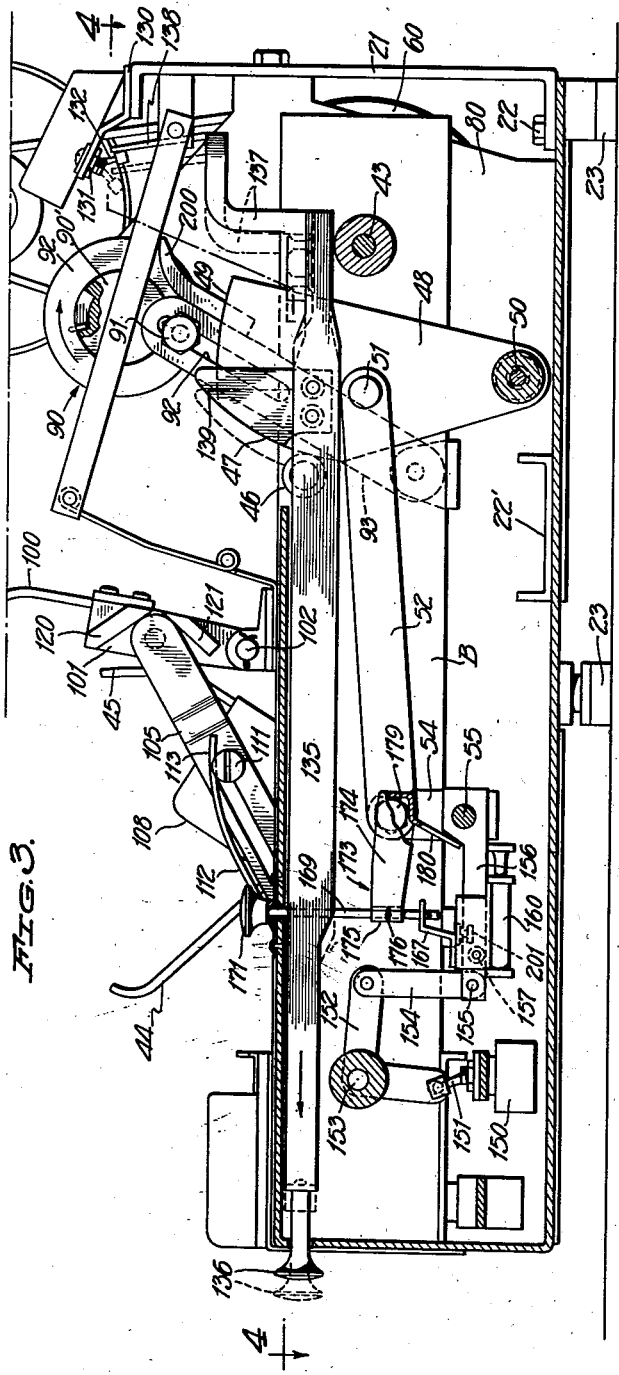

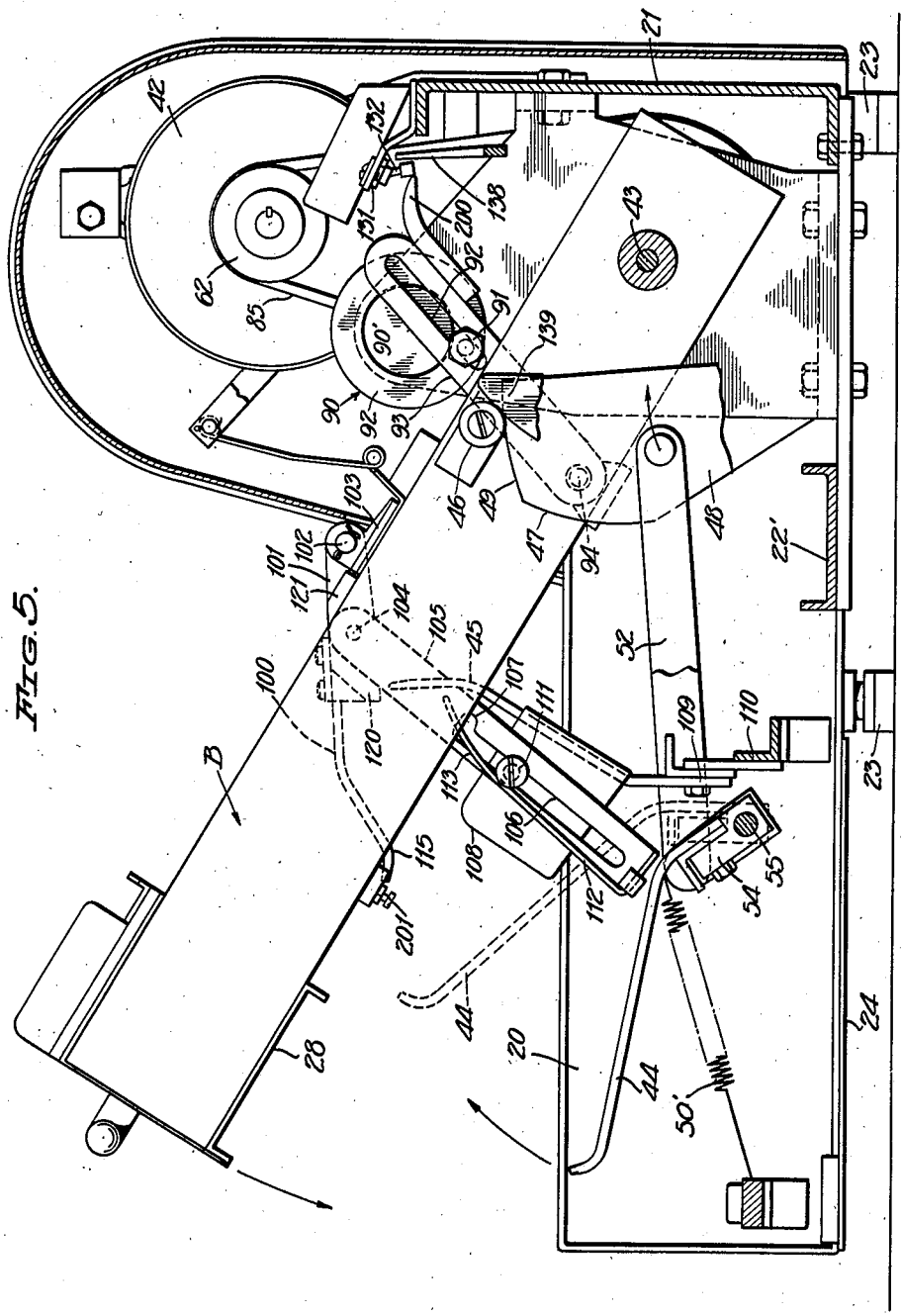

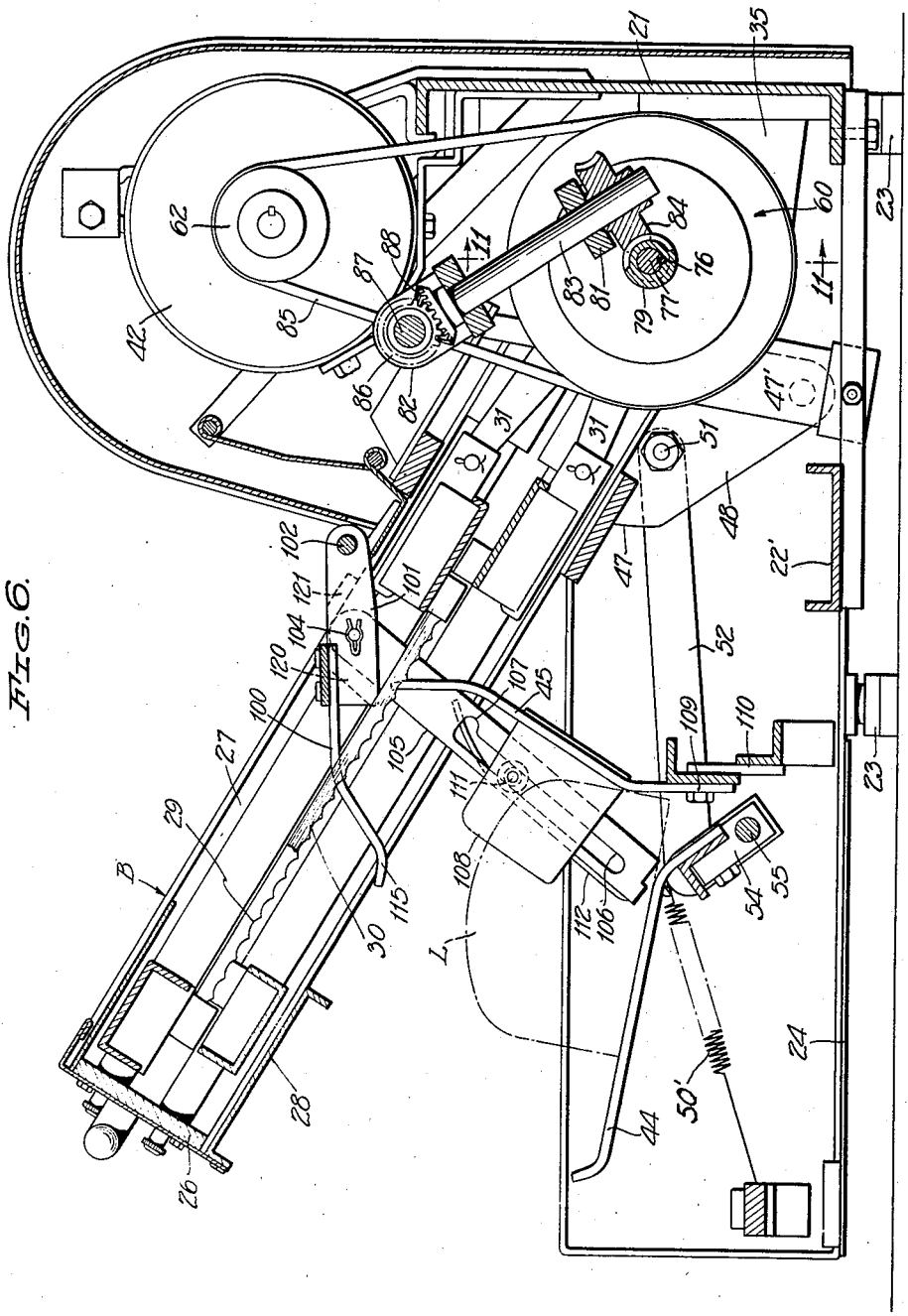

April 6, 1943.   M. BRUSTOWSKY   2,315,767
BREAD SLICING MACHINE
Filed Sept. 19, 1940   8 Sheets-Sheet 6

MORRIS BRUSTOWSKY.
INVENTOR.
BY Ely Pattison.
ATTORNEYS.

April 6, 1943.  M. BRUSTOWSKY  2,315,767
BREAD SLICING MACHINE
Filed Sept. 19, 1940  8 Sheets-Sheet 7

MORRIS BRUSTOWSKY,
INVENTOR.
BY Ely Pattison
ATTORNEYS.

WITNESS:

April 6, 1943.   M. BRUSTOWSKY   2,315,767
BREAD SLICING MACHINE
Filed Sept. 19, 1940   8 Sheets-Sheet 8

MORRIS BRUSTOWSKY.
INVENTOR.

BY Ely Pattison.

ATTORNEYS.

WITNESS:

Patented Apr. 6, 1943

2,315,767

UNITED STATES PATENT OFFICE 2,315,767

BREAD SLICING MACHINE

Morris Brustowsky, Brooklyn, N. Y., assignor to
U. S. Slicing Machine Company, La Porte, Ind.,
a corporation of Indiana Application September 19, 1940, Serial No. 357,380

28 Claims. (Cl. 146—147)

This invention relates to improvements in bread slicing machines and more particularly it pertains to that type of machine employed in delicatessen stores, bakeries, and grocery stores to slice a single loaf of bread, if the customer so desires. It is to be understood, however, that the invention is not to be limited to machines for slicing single loaves of bread and that it is capable of use in other types of bread slicing machines as well.

In one type of bread slicing machine, a plurality of knives are carried by a knife frame which surrounds a tray or similar support for a loaf of bread to be sliced. The knife frame is elevated manually to permit of placing a loaf of bread upon the tray and after the loaf is in position, the knife frame is permitted to descend under the influence of gravity. As the knife frame descends, the knives, which are motor driven, are movable through the loaf tray in a direction transversely of the loaf to divide the loaf into slices.

All machines of this type with which I am familiar have certain very noticeable disadvantages namely, they are unwieldy because of the weight of the knife frame, which as heretofore stated, is moved manually to its elevated position. To aid the manual operation, elevating springs have been employed and while they have served their purpose, they also interfere with the descent of the knife frame under the influence of gravity and this to such extent that it becomes necessary to apply manual force to depress the knife frame sufficiently to complete the slicing operation.

Another disadvantage of this type of machine lies in the failure of the knives, which are motor driven, properly to cut the loaf when first they engage the same, since no means is provided to hold the loaf immovable relatively to the tray during the early stages of the slicing operation.

One object of the present invention is to improve the construction and operation of bread slicing machines of the aforementioned type and to provide such machines with mechanisms which will render them less unwieldy and effect a better slicing operation.

A feature of the invention consists in the provision, in a slicing machine of the character above outlined, of power operated means for moving the knife frame to its elevated position to permit of placement of a loaf of bread to be sliced, in the loaf holding tray.

Another feature of the invention resides in the provision of mechanism whereby the elevation of the tray and operation of the knives may be accomplished by a single motor.

Another feature of the invention resides in a novel control mechanism whereby during operation of the motor to move the knife frame to its elevated position, the cutting knives cannot be operated and further, that during operation of the cutting knives, the knife frame elevating mechanism is incapable of operation.

Still another feature of the invention resides in the provision of means for holding a loaf of bread to be sliced upon the loaf tray during the initial stages of the slicing operation and subsequently releasing its hold upon the loaf after the slicing operation has progressed, but at a time before it has been completed.

Still a further feature of the invention resides in so constructing the aforementioned loaf holding means that it also serves to prevent distortion and consequent breaking of the knives which is important, particularly during the early stages of the slicing operation.

Other features of the invention relate to certain novel and improved constructions, arrangements and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

Figure 7:
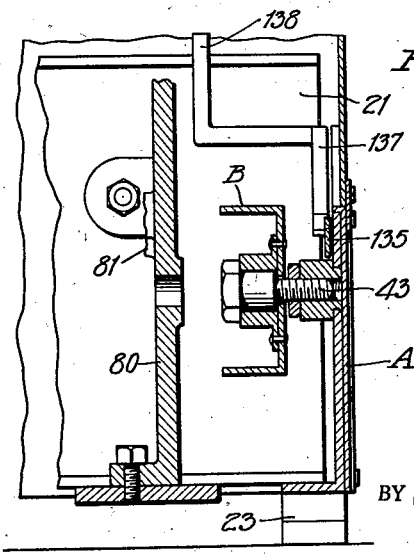
Figure 8:
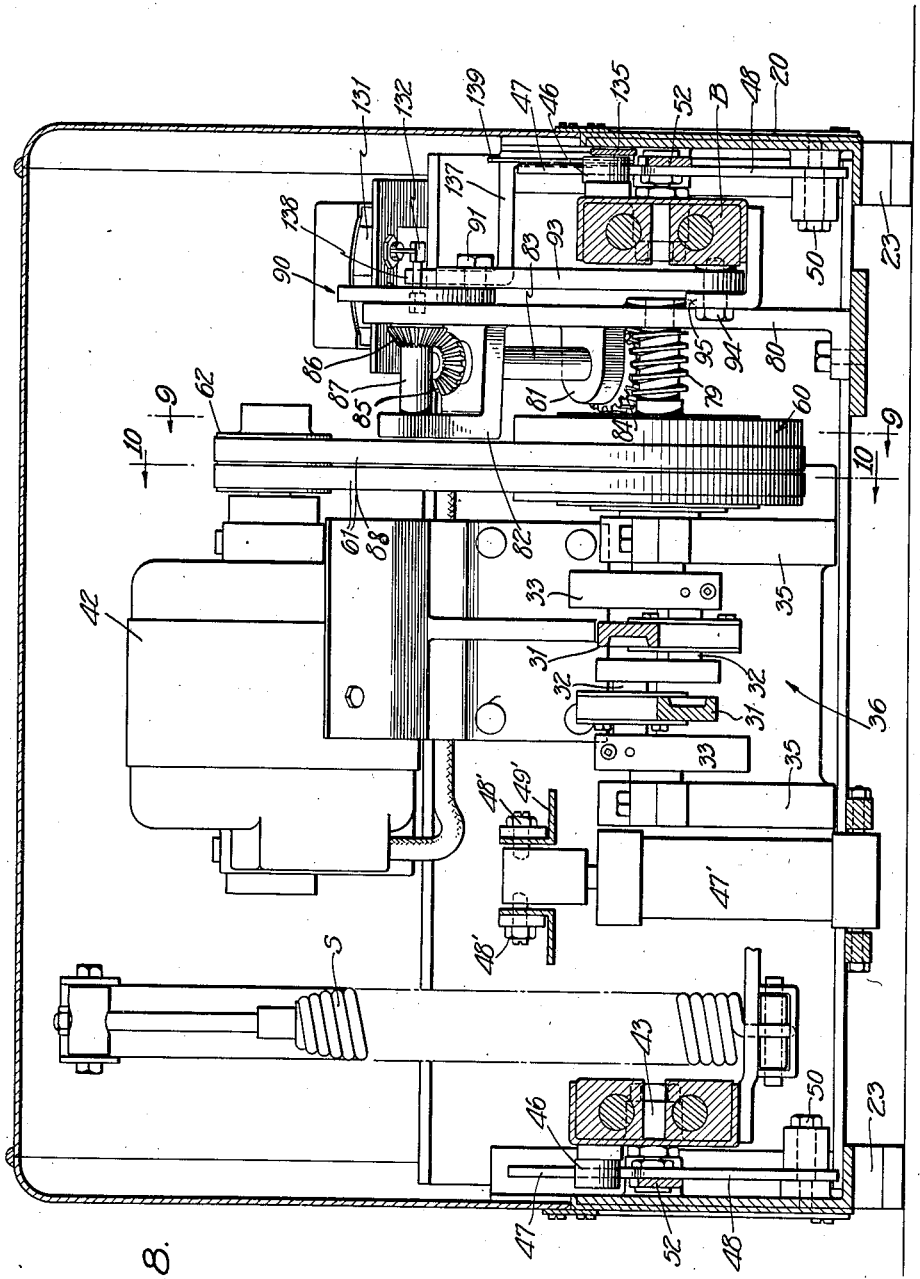
Figure 9:
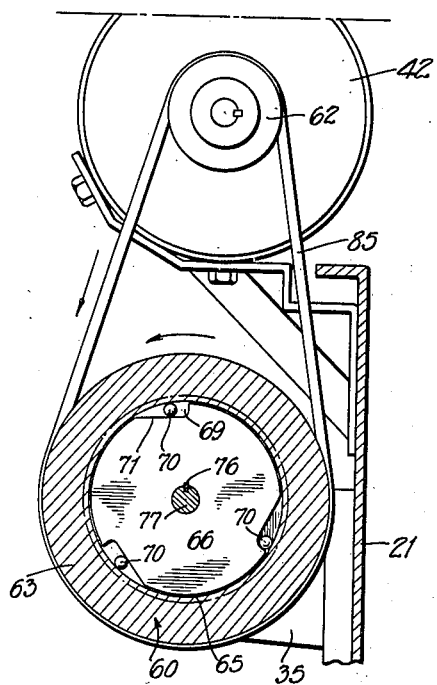
Figure 10:
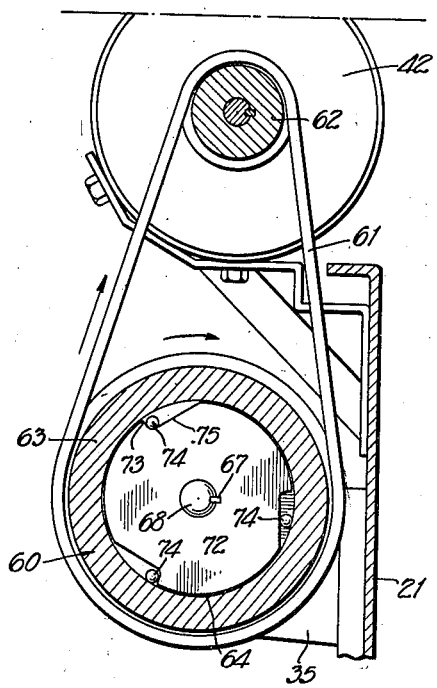
Figure 11:
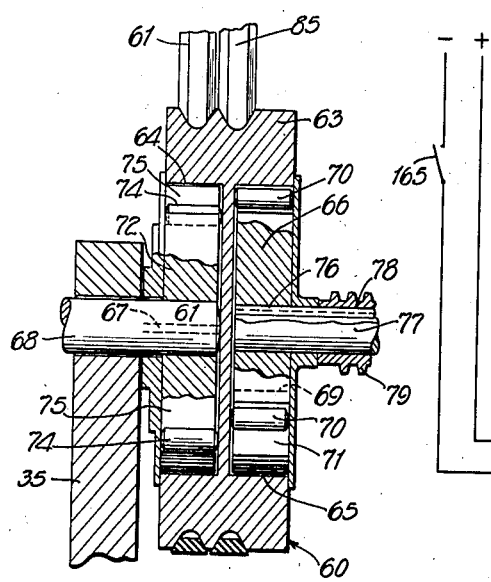
Figure 16:
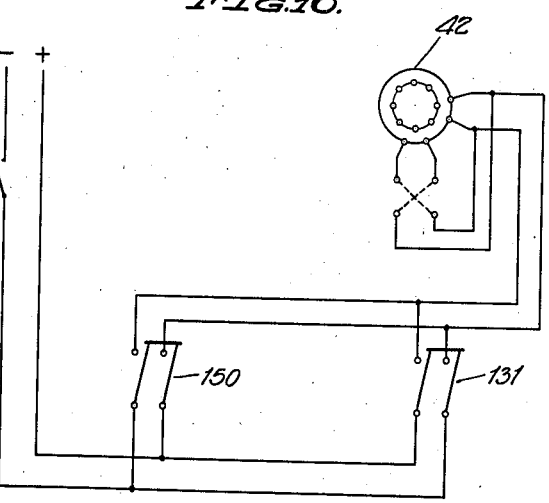

In the drawings:

Figure 1 is a perspective view of a bread slicing machine constructed in accordance with the present invention, Figure 2 is a view in side elevation, the view being on an enlarged scale, Figure 3 is a longitudinal sectional view on an enlarged scale taken substantially on the line 3—3 of Figure 1, Figure 4 is a fragmentary horizontal sectional view taken substantially on the line 4—4 of Figure 3, Figure 5 is a longitudinal sectional view on an enlarged scale taken substantially on the line 5—5 of Figure 1, the knife frame being shown in elevated position, Figure 6 is a longitudinal sectional view on an enlarged scale taken substantially on the line 6—6 of Figure 1, the knife frame being shown in elevated position, Figure 7 is a detail sectional view taken substantially on the line 7—7 of Figure 4, Figure 8 is a vertical sectional view taken substantially on the line 8—8 of Figure 2, Figure 9 is a vertical sectional view taken substantially on the line 9—9 of Figure 8, Figure 10 is a vertical sectional view taken substantially on the line 10—10 of Figure 8, Figure 11 is a detail sectional view on an enlarged scale taken substantially on the line 11—11 of Figure 6, Figures 12, 13 and 14 are detail sectional views illustrating in elevation, different operative positions of the motor controlling means, these views being taken substantially on the line 12—12 of Figure 1, Figure 15 is a detail view in elevation partly in section of a portion of the motor actuated knife frame elevating mechanism, and;

Figure 16 is a diagrammatic view of the motor circuits and circuit controlling means.

Referring to the drawings by reference character and particularly to Figure 1, a machine constructed in accordance with the present invention includes a supporting frame A, a knife frame B and a loaf supporting tray C.

The main frame A comprises two side walls 20, and a rear wall 21 secured together by bolts or the like 22. The side walls are connected by a transversely extending brace 22′ preferably in the form of a channel member, and feet 23 may be provided for supporting the main frame A. Flanges 24 at the forward end of the side walls serve to support a crumb tray 25 illustrated in Figure 1.

The knife frame comprises a rectangular member having a front wall 26 and two side walls 27 connected at their forward ends by a transversely extending brace 28 similar to the brace 22′ heretofore mentioned.

The rear end of the knife frame is open and mounted for sliding movement within the knife frame there are two sets of knives as indicated by the reference characters 29 and 30 in Figure 6. The two sets of knives are simultaneously driven in opposite directions to perform the cutting operation by connecting rods 31 operated by eccentrics 32 see Figure 6. The eccentrics 32 are mounted on cranks 33 which in turn are rotatably mounted in bearings in the arms 35 of a bracket 36 carried by the rear wall 21 of the main frame A. One of the cranks 33 is driven from a motor 42 through a suitable belt and pulley transmission mechanism.

The knife frame B is pivotally mounted on stub shafts 43 projecting inwardly from the side walls of the main frame, one of these stub shafts being illustrated in detail in Figure 7 of the drawings and it is adapted to be manually moved from the horizontal position in which it is shown in Figures 2 and 3, to the elevated position in which it is shown in Figures 5 and 6. The machine also includes two lifting springs similar to the one designated S in Figure 8 of the drawings to assist the manual operation of elevating the knife frame. Its movement to the elevated position permits of the insertion of a loaf of bread onto the bread tray, and also places the knife frame in position to descend under the influence of gravity in order to effect movement of the knives through a loaf of bread to perform a slicing operation.

The bread tray C comprises two comb like members 44 and 45, see Figure 1. They are angularly disposed with respect to each other and as illustrated in Figure 6, the comb like member 44 is adapted to move downwardly to receive a loaf of bread L as the knife frame is elevated to its elevated position.

Means is provided to hold the knife tray in its elevated position and this means comprises two rollers 46 there being one at each side of the knife tray at the rear thereof. These rollers ride the cam surfaces 47 of cam members 48 to the upper edges 49 thereof upon which the rollers rest to prevent downward movement of the knife frame. The cam members 48 are pivotally mounted on stub shafts or bolts 50 and pivotally connected to each of the cam members as at 51, there is a link 52 see Figures 3, 5 and 8. These links are pivotally connected to cranks 54 carried by a transversely extending shaft 55 upon the right hand end of which is mounted a hand operating lever 56 by upward movement of which the shaft 55 is rocked to move the cam members 48 towards the right in Figure 3, from beneath their respective rollers 46 to permit the knife frame to move in a downward direction to perform the slicing operation. The knife frame is retarded in its downward movement by a dash pot 47′ the piston of which is pivotally connected as at 48′ to brackets 49′ which extend rearwardly from the knife frame, see Figure 8.

The comb member 44 of the bread tray is secured to the cranks 54, see Figure 5, it being understood that there is one of these cranks at each side of the machine, and it is moved downwardly by means of a spring 53′ and upwardly by movement of the handle 56 to rotate the shaft 55.

When the knife frame is elevated, the comb member 44 of the bread tray is in the down position as illustrated in Figures 5 and 6 and when the handle is raised to release the knife frame and permit its descent to perform the slicing operation, the comb member 44 is elevated to the dotted line position in which it is shown in Figure 5 and in which position, together with the comb member 45, a substantially V-shaped bread tray is provided.

In so far as the machine has been described, it is well known in the prior art and the improvements forming the subject matter of the present application will now be described.

Means is provided to elevate the knife tray to its elevated position in which it is shown in Figures 5 and 6, by operation of a reversible motor 42 heretofore mentioned in lieu of performing this operation manually as in the prior machines.

Referring to Figure 8, there is a driving pulley 60 operated by means of a plurality of belts 61 of which there are preferably two. These belts 61 pass around, and are driven by, a pulley 62 carried by the shaft of the motor 42.

The pulley 60 is of the double clutch type see Figure 11 and comprises a main body or rim portion 63 which is formed to provide two recesses 64 and 65 in its opposite side faces.

Mounted in the recess 65 there is a clutch member 66 see Figure 9 and it is provided with a plurality of roller receiving pockets 69 in each of which is mounted a roller 70, each of which rollers rides the inclined wall 71 of its respective pocket to form a driving connection between the clutch member 66 and the pulley 60 when the shaft of the motor is rotated in a counter-clockwise direction as illustrated in Figure 9 of the drawings.

Mounted in the recess 64 there is a clutch member 72 which is keyed as at 67 to the shaft extension 68 of the right hand crank member 33 in Figure 8. This clutch member 72 has a plurality of roller receiving pockets 73 see Figure 10 in each of which is mounted a roller 74 which rides the inclined face 75 of its respective pocket to form a driving connection between the pulley 60 and the clutch member 72 when the shaft of the motor rotates in a clockwise direction as illustrated in Figure 10.

The clutch member 66 is keyed as at 76 to a shaft 77 and also as at 78 to a driving worm see Figure 11. Thus it will be seen that when the motor shaft rotates in a counterclockwise direction, the clutch member 66 will be driven as heretofore described to drive the shaft 77 and the driving worm 79.

The shaft 77 and its driving worm 79 are mounted in a bracket 80 as best illustrated in Figure 8 and said bracket 80 is provided with two arms 81 and 82 in which is mounted a shaft 83. The shaft 83 carries a worm gear 84 on its lower end which meshes with the driving worm 79 and upon its upper end the shaft 83 carries a beveled gear 85 which meshes with a beveled gear 86 mounted on a shaft 87 which in turn is rotatably mounted in the upper end of the bracket 80 and an extension 88 of the arm 82. The shaft 87 extends through the bracket 80 and upon its outer end, it carries a driving member 90.

The driving member 90 comprises a disk like member 90' carried by the shaft 87 and is shown in detail in Figure 15.

Referring to Figure 15, it will be noted that the disk like member 90' is surrounded by a ring member 92' which carries a driving pin 93' which projects into a recess 94' in the periphery of the disk like member 90'.

The ring member 92' of the driving member 90 has a crank pin 91, see Figures 3, 8 and 15, and this crank pin travels in an elongated slot 92, see Figure 3, in a lever 93, the lower end of which is pivotally connected by means of a bolt 94 to a bracket 95, see Figures 8 and 15, rigidly secured to the adjacent side of the knife frame B.

From the foregoing it will be obvious that as the ring member 92' of the driving member 90 is rotated in a clockwise direction, as illustrated in Figure 3 of the drawings and as the crank pin passes from its lower position in which it is shown in Figure 3 through approximately 180°, the knife frame will be moved to its elevated position, in which position the rollers 46 will rest upon the top edges 49 of the cams 48 to support the knife frame in its elevated position in which it is illustrated in Figure 5. Thus it will be seen that the knife frame instead of being moved manually to its elevated position as in the aforementioned machines of the prior art, is elevated by operation of the motor thus relieving the operator of the machine of the operation of elevating the knife frame.

By reference to Figures 9 and 10 it will be obvious that during operation of the motor in the counter-clockwise direction to elevate the knife frame, the pulley 60 rotates freely with respect to the clutch member 72 since the rollers 74 of the clutch member 72, when the pulley is moving in a counter-clockwise direction, will not provide a driving connection between the clutch member 72 and the pulley 60.

When the knife frame reaches the full extent of its elevation, the motor is automatically stopped in a manner which will be hereinafter described and the knife frame will be retained in its elevated position until the motor is reversed and its shaft rotated in a clockwise direction.

A loaf of bread having been placed on the comb like member 44 of the bread tray as illustrated in Figure 6, the knife frame is permitted to descend under the influence of gravity to bring the knives 29 and 30 into slicing engagement with the bread and during descent of the knife frame the sets of knives 29 and 30 are reciprocated simultaneously in opposite directions by the motor 42 to effect the slicing operation and the manner in which this is accomplished will now be described.

It will be remembered that the motor 42 has been reversed and its shaft is rotating in a clockwise direction. This movement drives the pulley 60 in a clockwise direction causing the rollers 74 in the pockets of the clutch member 72 to form a driving connection between the pulley and the clutch member 72 to operate the shaft extension 68 of the crank 33 and thereby effect reciprocation of the knives 29 and 30. As the clutch member 72 is driven to operate the knives as just described, the rollers 70 of the clutch member 66 ride the inclined walls of their respective pockets in a direction to release the driving connection between the clutch member 66 and the pulley, and the pulley then rotates idly with respect to the clutch member 66.

The knife frame B is permitted to move from its elevated position to its lower position in the manner heretofore described, that is by moving the cam members 48 from beneath the rollers 46 carried by the knife frame by means of the manually operated lever 56.

As heretofore stated the motor 42 is of the reversible type and suitable switches are provided to operate the motor to effect its reversal at the desired time. These switches as will be hereinafter more specifically described, are automatically controlled in such a manner that when the motor is operating in a counter-clockwise direction to elevate the knife frame, the switches are locked to prevent reversal of the motor to drive the knives of the knife frame until the knife frame has reached its full elevated position. When the knife frame is descending and the motor is operating in the clockwise direction to drive the knives, the switches are locked to prevent reversal of the motor until the knife frame has reached the extent of its downward movement and the slicing operation has been completed and the manner in which this is accomplished will be hereinafter described.

Means is also provided to retain the loaf of bread steady within the bread tray during the early portion of the slicing operation and until the knives have partially sliced the loaf.

This means consists of a supplemental comb like member 100. This supplemental comb like member 100 extends throughout the length of the bread tray. At each end it has an arm 101 and these arms are pivotally mounted upon a shaft 102 which extends transversely of the knife frame of the machine. The shaft 102 is mounted in brackets 103 carried by the knife frame as illustrated in Figure 1 and the supplemental comb like member 100 is thus pivotally mounted upon the knife frame B. Pivotally connected to each of the arms 101 as at 104 there is a link 105. Each of these links 105 has an elongated slot 106 at the upper end of which there is an off-set portion 107. The reference character 108 designates a plate, there being one of such plates rigidly attached to each end of the comb like member 45 which in turn is rigidly supported as at 109 by brackets 110 suitably secured to the main frame at each end of the comb like member 45. Rigidly carried by each of the plates 108 and operating in the elongated slot 106 of its respective link 105, there is a bolt or the like 111 and rigidly carried by each of the links 105, there is a spring 112 the upper end portion 113 of which engages its respective bolt 111. With the parts in the position in which they are shown in Figures 1 and 2, as the knife frame is elevated, the arms 101 are rocked about their pivotal points 104 on the shaft 102 and the supplemental comb like member 100 is moved as indicated by the arrow X in Figure 2 in such manner that its projecting fingers 115 are moved between the knives 29 and 30 as illustrated in Figure 6.

This movement of the supplemental comb like member 100 is effected by reason of the upward movement of the pivotal points of the arms 101 which movement rocks the arms about their respective pivotal points 104 on the links 105, the links pivoting about the bolts 111 which are maintained in the off-set portions 107 of their respective elongated slots 106 by the springs 112 during the upward movement of the knife frame. However, before the knife frame reaches its fully elevated position, lugs 120 on the arms 101 will engage the links 105, see Figure 6, and will rock them about their pivotal points 104 to the right in Figure 6 to release the bolts 111 from the off-set portions 107 of the elongated slots to permit the bolts 111 to move through the elongated slots 106 as the knife frame continues to its full elevated position. As the bolts 111 move out of the off-set portions 107 of the slots 106, lugs 121 on the arms 101 engage the side members of the knife frame to support the supplemental comb like member 100 in the down position in which it is shown in Figure 6.

The manner in which the motor control switches are controlled and one complete cycle of operation will now be described.

Carried by the main frame A, at the rear thereof, there is a bracket 130 upon which is mounted a snap switch 131, the lever 132 of which extends angularly downwardly as best illustrated in Figure 3. The circuits to the motor are so arranged that when this switch is closed, that circuit to the motor will be closed which causes the motor to operate in the counterclockwise direction to elevate the knife frame which is the first step in the operation of the machine. In Figure 3, the switch lever is shown in full lines in circuit opening position and in dotted lines in circuit closing position.

The switch 131 is operated by means of a lever 135 which is slidably mounted upon the inner face of the right hand side wall of the main frame A. This lever 135 has a hand knob 136 upon its forward end by which it may be moved to operate the switch 131. Upon its inner or rear end, the lever 135 is provided with an upstanding extension 137 which in turn carries an upstanding switch operating arm 138. This lever 135 also carries near its rear end, an upstanding member 139, the upper end of which projects above the upper edge 49 of the cam member 48 as illustrated in Figure 3.

Figure 12:
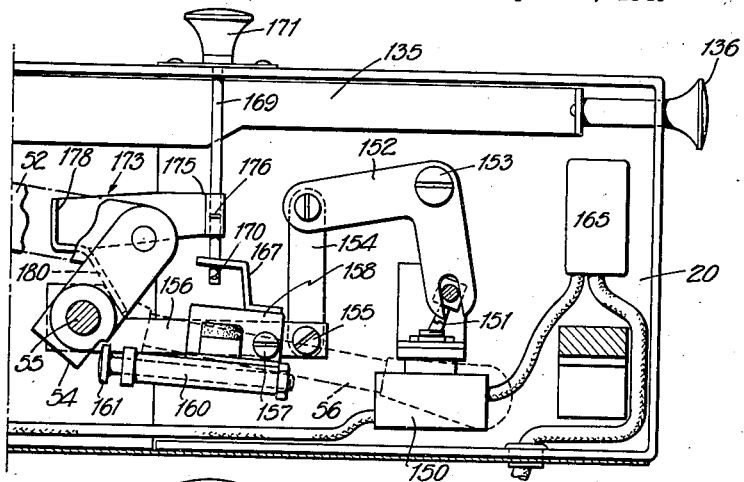
Figure 13:
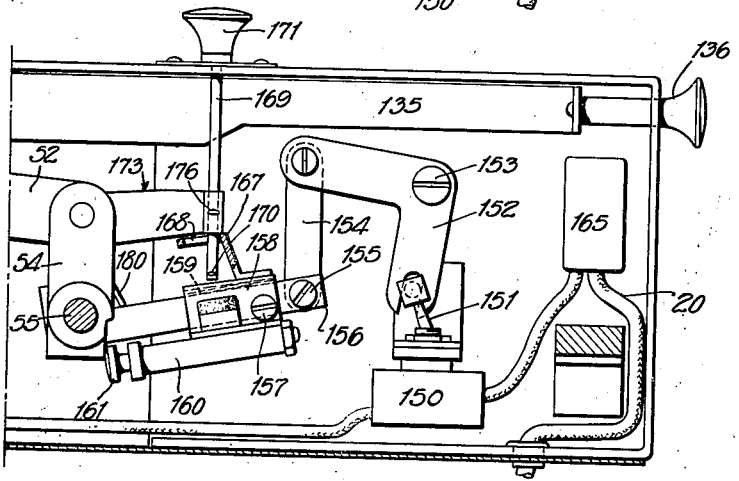
Figure 14:
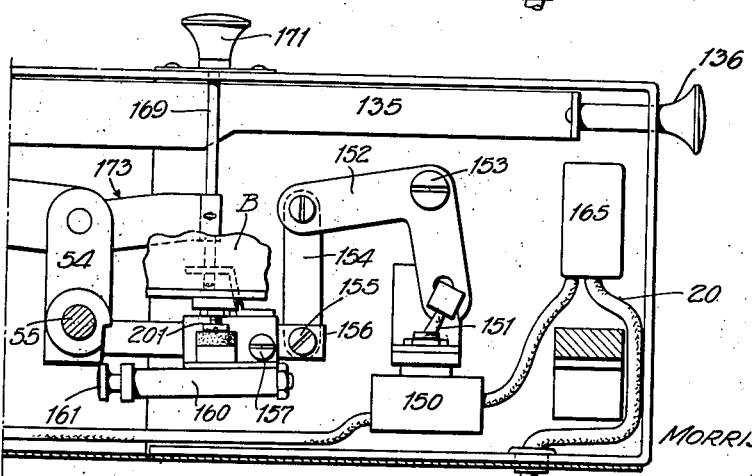

At the front of the right hand side wall of the main frame A, see Figures 12, 13 and 14, there is a second snap switch 150 having a switch lever 151. This switch controls the circuit which operates the motor in a clockwise direction to reciprocate the knives to perform the slicing operation.

The switch lever 151 is operated by means of a bell crank lever 152 pivoted as at 153 to the main frame A. Connected to the bell crank lever 152, there is a link 154 which is also connected as at 155 to a lever 156 loosely mounted upon the shaft 55.

Pivotally mounted as at 157 upon the lever 156, there is a housing 158 and interposed between the upper edge of the lever 156 and the top wall of the housing, there is a spring 159. Carried by the housing 158 at a point beneath the housing, there is an operating member 160 which has an extension 161 which in the normal inoperative position of the several parts lies just beneath the lower end of the right hand crank 54 as illustrated in Figure 14.

The reference character 165 designates a switch which controls the supply of current from a suitable source of power not shown to the switches 131 and 150, the throw lever of this switch being designated 166 and illustrated in Figure 2.

Carried by the housing 158 and extending upwardly therefrom, there is a rigid arm 167 having a slot 168 therein. An operating member 169 carried by the side wall of the main frame has its lower end extended through the slot 168 and has a cross pin 170 extending therethrough. Upon its upper end, the operating member has an operating knob 171 which may be grasped to raise the operating member 169 for a purpose to be hereinafter described. Also carried by the operating member 169 there is a locking member 173 which under certain conditions, prevents operation of the operating member 169. The locking member 173 comprises a body portion 174, one end of which is rolled around the operating member 169 as at 175 and a cross pin 176 passing through the body portion and the operating member secures the locking member to the operating member. The locking member 173 has a right angular extension 178, see Figure 12, which forms a pocket or seat for the reception of the head 179 of the bolt which forms the pivotal connection between the link 52 and the crank 54 at the right hand side of the machine, see Figure 3. The locking member 173 also has a projection 180 which extends angularly downwardly into engagement with the top wall of the lever 156 as best illustrated in Figures 3 and 12.

With the several parts of the machine in their normal position of rest, in which position they are shown in Figures 1 and 3, and assuming that the current to the machine has been turned on by closing of the switch 165, the first step in the operation is the raising of the knife frame to its elevated position and to position the bread tray to receive a loaf of bread to be sliced.

To accomplish the foregoing, the switch 131 is closed by grasping the hand knob 136 and moving the lever 135 to the position in which it is shown in dotted lines in Figure 3. This movement of the lever 135 causes the upstanding extension 137 thereof to engage the throw lever 132 of the switch 131 to close the circuit to the motor to operate it in the counterclockwise direction to elevate the knife frame in the heretofore described manner.

By reference to Figure 15 of the drawings it will be noted that as the crank pin 91, passes over top dead center, the weight of the lever 93 will effect rotation of the ring member 92' relatively to the disk like member 90', until the pin 93' engages the opposite end wall of the recess 94' to that with which it is shown in engagement in said Figure 15. Carried by the lever 93, there is a rigid finger 200, which during this free movement of the ring member 92' engages the throw lever 132 of the switch 131 effecting an opening of the circuit to the motor and stopping the same.

By reference to Figure 5, it will be noted that the upstanding member 139 of the lever 135 is positioned behind the roller 46 of the knife frame and thus prevents operation of said lever to again close the switch 131, so long as the knife frame is in the elevated position.

A loaf of bread to be sliced is next placed upon the comb member 44 of the bread tray and the knife frame is permitted to move to the lowered position under the influence of gravity.

During the descent of the knife frame, the knives thereof are driven to perform the slicing operation and the manner in which this operation is accomplished will now be described.

As the knife frame moved to its elevated position, the shaft 55 was rotated in the counterclockwise direction by the spring 50', the handle 56 being moved to its down position.

To permit the knife frame to lower, the handle 56 is raised. This action, through the medium of the link 52, moves the cam members 48 from beneath the rollers 46 thereby removing the support of the knife frame.

In Figure 12 of the drawings, the switch 150 is as heretofore mentioned, in its circuit opening position and the handle 56 shown in dash lines is down. As the handle is raised, the crank 54 engages the extension 161 of the operating member 160, rocking the housing to the position in which it is shown in Figure 13 and through the medium of the link 154 and the bell crank lever 152, the switch 150 is operated to close that circuit to the motor to drive the same in the clockwise direction to drive the knives in the heretofore described manner.

As the knife frame reaches its lower position of rest, a foot or projection 201, carried by the knife frame, engages the housing 158, see Figure 14, rocking the same about the pivotal point 157 from the position in which it is shown in Figure 13, to that in which it is shown in Figures 12 and 14, thus snapping off the switch 150 and opening the knife driving circuit to the motor.

Since the closing of the switch 150 can only be accomplished by the handle 56 when in its lowered position, in which position the knife frame is elevated, it will be obvious that operation of the switch 150 is impossible when the knife frame is lowered and the handle 56 is in its raised position.

The operating member 169 may be employed to operate the switch 150 in lieu of the handle 56 under certain conditions.

For example, if a large loaf of bread is to be sliced, the machine is operated as before described to raise the knife frame. After the large loaf has been placed in the loaf tray, the parts will be in the position illustrated in Figure 12. By exerting an upward pull upon the operating member 169, the housing 158 may be rocked about its pivotal point 157 to move the switch lever 151 to circuit closing position to operate the knives, the knife frame remaining in its elevated position.

After the slicing operation has started, the handle 56 may be operated to permit the knife frame to descend as heretofore described.

The operating member 169 is capable of operation only when the knife frame is in its elevated position, since, as heretofore described, when the knife frame reaches its lower position, the head 179 of the bolt which forms the pivotal connection between the link 52 and the crank 54 enters the pocket of the locking member 173 as shown in Figure 3, and prevents elevation of the operating member 169.

From the foregoing, it will be obvious that a construction and arrangement is provided by which the objects of the invention are accomplished, and while the invention has been herein illustrated in its preferred form, it is to be understood that it may be carried out in such other forms as may fall within the scope of the appended claims.

Having thus described my invention, what I claim as new is:

1. In a bread slicing machine, a loaf supporting tray, a knife frame, a plurality of knives carried by the knife frame, a motor, drive means operated by the motor, means operated by said drive means for operating the knives of the knife frame to effect a loaf slicing operation, means operated by the drive means for elevating the knife frame relatively to the loaf tray to permit the placement of an unsliced loaf thereon, and means including a double acting clutch means for rendering said drive means ineffective to operate said knives during elevation of said knife frame and for rendering the drive means ineffective to elevate the frame during operation of the knives.

2. In a bread slicing machine, a loaf supporting tray, a knife frame, a plurality of knives carried by the knife frame, a motor, means operated by the motor for operating the knives of the knife frame to effect a loaf slicing operation, separate means operated by the motor for elevating the knife frame relatively to the loaf tray to permit the placement of an unsliced loaf thereon, and means for rendering said knife operating mechanism and said knife frame elevating mechanism alternately operable.

3. In a bread slicing machine, a loaf supporting tray, a knife frame, a plurality of knives carried by the knife frame, a motor, means operated by the motor for operating the knives of the knife frame to effect a loaf slicing operation, separate means operated by the motor for elevating the knife frame relatively to the loaf tray to permit the placement of an unsliced loaf thereon, means for rendering the knife operating means inoperative to drive the knives during elevation of the knife frame, and means for rendering the knife frame elevating means inoperative during operation of the knives.

4. In a bread slicing machine, a loaf supporting tray, a pivotally mounted knife frame, said knife frame being movable about its pivotal axis to an elevated position relatively to the loaf supporting tray to permit the placement of a loaf of bread to be sliced thereon, a motor, means operated by the motor for moving the knife frame to its elevated position, a plurality of knives carried by the knife frame and movable through the tray transversely of a loaf of bread carried thereby to divide the loaf into a plurality of slices, means operated by said motor for operating the knives to effect the loaf slicing operation, and means for rendering the motor operated knife frame elevating means and the motor operated knife operating means alternately operable.

5. In a bread slicing machine, a loaf supporting tray, a pivotally mounted knife frame, said knife frame being movable about its pivotal axis to an elevated position relatively to the loaf supporting tray to permit the placement of a loaf of bread to be sliced thereon, a motor, means operated by the motor for moving the knife frame to its elevated position, a plurality of knives carried by the knife frame and movable through the tray transversely of a loaf of bread carried thereby to divide the loaf into a plurality of slices, means operated by said motor for operating the knives to effect the loaf slicing operation, and means dependent upon the position of the knife frame for rendering the knife frame elevating means and the knife operating means alternately operable.

6. In a bread slicing machine, a loaf supporting tray, a pivotally mounted knife frame, said knife frame being movable about its pivotal axis to an elevated position relatively to the loaf supporting tray to permit the placement of a loaf of bread to be sliced thereon, a motor, means operated by the motor for moving the knife frame to its elevated position, a plurality of knives carried by the knife frame and movable through the tray transversely of a loaf of bread carried thereby to divide the loaf into a plurality of slices, means operated by said motor for operating the knives to effect the loaf slicing operation, and means dependent upon the position of the knife frame for rendering the knife operating means inoperative during elevation of the knife frame and for rendering the knife frame elevating means inoperative during operation of the knife operating means.

7. In a machine of the type described, a loaf supporting tray, a knife frame surrounding the tray and movable relatively thereto, a plurality of loaf cutting knives mounted in the knife frame and operable to sever a loaf of bread supported by the tray into a plurality of slices as the knife frame is moved in one direction relatively to the tray, loaf holding means carried by said knife frame adapted to engage a loaf of bread upon the tray to hold the loaf in position prior to engagement thereof by the knives and during a portion of a cutting operation of the knives, and means for releasing the loaf holding means prior to the completion of the cutting operation.

8. In a machine of the type described, a loaf supporting tray, a knife frame surrounding the tray and movable relatively thereto, a plurality of loaf cutting knives mounted in the knife frame and operable to sever a loaf of bread supported by the tray into a plurality of slices as the knife frame is moved in one direction relatively to the tray, said tray including a plurality of comb-like members for supporting the loaf in substantially fixed position on the tray, additional loaf holding means for engagement with a loaf of bread upon the tray for holding the same in position prior to engagement thereof by the knives and during a portion of a cutting operation of the knives, and means operable by movement of the knife frame relatively to the tray for releasing said additional loaf holding means prior to the completion of the cutting operation.

9. In a machine of the type described, a loaf supporting tray, a knife frame movable relatively to said tray, a plurality of loaf cutting knives movable through the tray transversely of a loaf of bread supported thereon upon movement of the knife frame in one direction, said tray including a plurality of comb-like members for supporting the loaf in substantially fixed position on the tray, additional means operated by the said movement of the knife frame for clamping in position a loaf of bread upon the tray until after it has been engaged and partly cut by the knives, and means for moving said loaf clamping means out of holding engagement with the loaf after the knives have engaged the loaf but prior to the completion of the cutting operation.

10. In a machine of the type described, a loaf supporting tray, a knife frame movable relatively to said tray, a plurality of loaf cutting knives movable through the tray transversely of a loaf of bread supported thereon upon movement of the knife frame in one direction, said tray including a plurality of comb-like members for supporting the loaf in substantially fixed position on the tray, additional means operated by the said movement of the knife frame for clamping in position a loaf of bread upon the tray until after it has been engaged and partly cut by the knives, and means for moving the loaf clamping means out of holding engagement with the loaf after the knives have engaged the loaf but prior to the completion of the cutting operation, said means being operated by the knife frame as it moves the knives through the loaf.

11. A slicing machine of the character described comprising a loaf supporting tray, a knife frame movable relatively to said tray, a plurality of loaf cutting knives movable through the tray transversely of a loaf supported thereon upon movement of the knife frame in one direction to sever said loaf into a plurality of slices, means on said tray including a fixed comb member, a movable comb member for retaining the loaf in position during slicing thereof, and additional holding means carried by the knife frame and movable into engagement with an upper portion of the loaf for holding the loaf in position upon the tray prior to engagement thereof by said cutting knives and during a portion of the slicing operation.

12. A slicing machine of the character described comprising a loaf supporting tray, a knife frame movable relatively to said tray, a plurality of loaf cutting knives movable through the tray transversely of a loaf supported thereon upon movement of the knife frame in one direction to sever said loaf into a plurality of slices, means on said tray including a movable comb member for engaging longitudinally extending portions of the loaf to retain the loaf in position during slicing thereof, and additional holding means carried by said knife frame and movable into engagement with a longitudinally extending portion of the loaf for holding the loaf in position upon the tray prior to engagement thereof by said cutting knives and during a portion of the slicing operation.

13. A slicing machine of the character described comprising a loaf supporting tray, a knife frame movable relatively to said tray, a plurality of loaf cutting knives movable through the tray transversely of a loaf supported thereon upon movement of the knife frame in one direction to sever said loaf into a plurality of slices, means pivotally mounted on said knife frame for engaging a loaf of bread on said tray and holding the loaf in position during an initial portion of the slicing operation, and means including an operative connection between said holding means and said tray for moving the holding means out of engagement with the loaf prior to the completion of the cutting operation.

14. A slicing machine of the character described comprising a loaf supporting tray, a knife frame movable relatively to said tray, a plurality of loaf cutting knives movable through the tray transversely of a loaf supported thereon upon movement of the knife frame in one direction to sever said loaf into a plurality of slices, a loaf engaging and holding means pivotally mounted on said knife frame, and means including an operative connection between said loaf engaging and holding means and said tray for moving the holding means into a position for engagement with a loaf upon the tray prior to and during a portion of the cutting operation and for moving the holding means out of engagement with the loaf prior to completion of the cutting operation.

15. A slicing machine of the character described comprising a loaf supporting tray, a knife frame movable relatively to said tray, a plurality of loaf cutting knives movable through the tray transversely of a loaf supported thereon upon movement of the knife frame in one direction to sever said loaf into a plurality of slices, a loaf engaging and holding means pivotally mounted on said knife frame, and means for moving the holding means into a position for engagement with a loaf upon the tray prior to and during a portion of the cutting operation and for moving the holding means out of engagement with the loaf prior to completion of the cutting operation, said last named means including an arm pivotally connected to said loaf engaging and holding means and provided with an elongated slot having an offset portion at one end thereof, and a member receivable within said slot and offset and fixedly mounted with respect to said tray.

16. A slicing machine of the character described comprising a loaf supporting tray, a knife frame movable relatively to said tray, a plurality of loaf cutting knives movable through the tray transversely of a loaf supported thereon upon movement of the knife frame in one direction to sever said loaf into a plurality of slices, a loaf engaging and holding means pivotally mounted on said knife frame, and means for moving the holding means into a position for engagement with a loaf upon the tray prior to and during a portion of the cutting operation and for moving the holding means out of engagement with the loaf prior to completion of the cutting operation, said last named means including an arm pivotally connected to said loaf engaging and holding means and provided with an elongated slot having an offset portion at one end thereof, a member receivable within said slot and offset and fixedly mounted with respect to said tray, spring means tending to urge and retain said member in said offset portion, and means on said loaf engaging and holding means adapted to engage said arm and release said member from said offset portion.

17. A slicing machine of the character described comprising a loaf supporting tray, a knife frame movable with respect to said tray, a plurality of knives carried by said knife frame and movable therein to effect a slicing operation, means for effecting slicing movement of said knives, means for elevating said knife frame with respect to said tray, a motor, and means for separately and independently driving said knife moving means and said knife frame elevating means from said motor including a pair of one-way driving devices each responsive to a different direction of rotation of the motor.

18. A slicing machine of the character described comprising a loaf supporting tray, a knife frame movable with respect to said tray, a plurality of knives carried by said knife frame and movable therein to effect a slicing operation, means for effecting slicing movement of said knives, means for elevating said knife frame with respect to said tray, a reversible motor, a rotary member driven by said motor, a pair of driven members each operatively connected with said rotary member by clutch means providing for driving only one of the driven members upon rotation of said motor in one direction and for driving only the other of the driven members upon rotation of the motor in the opposite direction, means providing a driving connection between one of said driven members and said knife moving means, and means providing a driving connection between the other of said driven members and said knife frame elevating means.

19. A slicing machine of the character described comprising a loaf supporting tray, a knife frame movable with respect to said tray, a plurality of knives carried by said knife frame and movable therein to effect a slicing operation, means for effecting slicing movement of said knives, means for elevating said knife frame with respect to said tray, a reversible motor, switch means for effecting selective operation of said motor in either direction, means for effecting a driving connection between said motor and only said knife moving means upon operation of the motor in one direction, and means for effecting a driving connection between said motor and only said knife frame elevating means upon operation of the motor in the opposite direction.

20. A slicing machine of the character described comprising a loaf supporting tray, a knife frame movable with respect to said tray, a plurality of knives carried by said knife frame and movable therein to effect a slicing operation, means for effecting slicing movement of said knives, means for elevating said knife frame with respect to said tray, a reversible motor, switch means for effecting selective operation of said motor in either direction, means operated by rotation of said motor in one direction for effecting a driving connection between the motor and said knife moving means, and means operated by rotation of said motor in the opposite direction for effecting a driving connection between the motor and said knife frame elevating means.

21. A slicing machine of the character described comprising a loaf supporting tray, a knife frame movable with respect to said tray, a plurality of knives carried by said knife frame and movable therein to effect a slicing operation, means for effecting slicing movement of said knives, means for elevating said knife frame with respect to said tray, a reversible motor, switch means for effecting selective operation of said motor in one direction, a second switch means for effecting selective operation of said motor in the opposite direction, means for operating said knife moving means upon operation of the motor in the one direction, means for operating said knife frame elevating means upon operation of the motor in the opposite direction, and interlocking means for preventing operation of said first switch means until said frame is raised to elevated position and for preventing operation of said second switch means after said frame is raised to elevated position.

22. A slicing machine of the character described comprising a loaf supporting tray, a knife frame movable with respect to said tray, a plurality of knives carried by said knife frame and movable therein to effect a slicing operation, a motor, means operated by said motor for effecting a slicing movement of said knives, means operated by said motor for elevating said knife frame relatively to said tray and providing for lowering of the knife frame under action of gravity, latch means for retaining said knife frame in elevated position, manual means for releasing said latch means, switch means operated upon latch releasing movement of said manual means for starting operation of said motor to operate said knife moving means, means for effecting operation of said switch means to start said motor independently of operation of said manual means, and means for preventing operation of said switch means to start said motor by either said manual means or said independently operable means until said frame is moved to a predetermined elevated position.

23. A slicing machine of the character described comprising a loaf supporting tray, a knife frame movable with respect to said tray to an elevated loaf receiving position, a plurality of knives carried by said knife frame and movable therein to effect a slicing operation, a motor, means operated by said motor for effecting a slicing movement of said knives, latch means for retaining said knife frame in elevated position, manual means for releasing said latch means, switch means operated upon latch releasing movement of said manual means for starting operation of said motor to operate said knife moving means, means for effecting operation of said switch means to start said motor independently of operation of said manual means, and means for preventing operation of said switch means to start said motor by either said manual means or said independently operable means until said frame is moved to a predetermined elevated position.

24. A slicing machine of the character described comprising a loaf supporting tray, a knife frame movable with respect to said tray, a plurality of knives carried by said knife frame and movable therein to effect a slicing operation, a motor, means operated by said motor for elevating said knife frame relatively to said tray, switch means for controlling said motor to effect operation of said frame elevating means, and means including a loose connection in said elevating means for operating said switch to terminate operation of said motor when the knife frame reaches a pre-determined raised position.

25. In a bread slicing machine, a loaf supporting tray, a knife frame movable relatively to the tray to move its knives through a loaf of bread upon the tray to divide the same into slices, drive means for operating the knives to effect a slicing operation, means operated by said drive means for moving the knife frame relatively to the loaf supporting tray, and means for maintaining said knives inoperative during movement of the knife frame relatively to the loaf supporting tray by said drive means.

26. In a bread slicing machine, a loaf supporting tray, a knife frame, a plurality of knives carried by the knife frame, a motor, drive means operated by said motor, means operated by said drive means for operating the knives in the knife frame to effect a loaf slicing operation, means operated by said drive means for elevating the knife frame relatively to the loaf tray to permit the placing of a loaf of bread thereon, and means for rendering said drive means ineffective to operate said knives during elevation of said knife frame.

27. In a machine of the type described, a loaf supporting tray, a plurality of cutting elements movable through the tray transversely of a loaf supported thereon to divide the loaf into a plurality of slices, said tray comprising two sets of comb members extending in an upward direction at an acute angle to each other to support a loaf in substantially fixed position therebetween, additional means movable into engagement with an upper portion of a loaf supported between said comb members to clamp the loaf until after the cutting elements move into cutting engagement with the loaf, and means for moving said additional clamping means out of engagement with the loaf prior to the completion of the cutting operation.

28. In a machine of the type described, a loaf supporting tray, a plurality of cutting elements movable through the tray transversely of a loaf supported thereon to divide the loaf into a plurality of slices, said tray comprising two sets of comb members extending in an upward direction at an acute angle to each other to support a loaf in substantially fixed position therebetween, an additional comb member movable into engagement with an upper portion of a loaf supported between said tray comb members to clamp the loaf until after the cutting elements move into cutting engagement with the loaf, and means for moving said additional clamping means out of engagement with the loaf prior to the completion of the cutting operation.

MORRIS BRUSTOWSKY.